June 20, 1961   F. NOSENZO ET AL   2,989,602
SAFETY WARNING DEVICE
Filed Dec. 15, 1958

INVENTORS
FERRUCCIO NOSENZO
LEANDRO LUNATI
BY Irwin D. Thompson
ATTY.

United States Patent Office 2,989,602
Patented June 20, 1961

2,989,602
SAFETY WARNING DEVICE
Ferruccio Nosenzo, Via Cherubini 21, and Leandro Lunati, Via Belmonte 2, both of Turin, Piedmont, Italy
Filed Dec. 15, 1958, Ser. No. 780,534
Claims priority, application Italy Dec. 20, 1957
2 Claims. (Cl. 200—84)

This invention relates to an electrical liquid-level signalling and/or control device.

It is well known that a shortage of the braking liquid in the hydraulic braking systems of automobiles may represent a great danger. Said shortage, which is generally due to a pipe fracture, appears suddenly, on occasion of non-braking, and this may cause irreparable accidents.

Previously there have been proposed several warning or safety devices, generally based on the adoption of an electrical circuit, which is closed by a float fitted inside the tank containing the braking liquid, said circuit (when closed) actuating a warning or operating device.

The above-mentioned devices—the theoretic principle of which is unobjectionable—did not meet in practice with a desired result, since the closing of the electrical circuit by means of immersed contacts takes place in the braking liquid with the movement of the float against them, so that said liquid should have very good insulating characteristics, which it does not have.

In consequence thereof, a permanent current flow occurs between the contacts which, on the contrary, ought to be bridged only at the very moment that the switch member, which is unitary with the float, drops and contacts them. Such a flow of current, besides representing a waste of the battery current, is the cause of electrolytic corrosion of the metal parts of both the device and the tank, the more so in the case of direct current.

Several inconveniences may ensue therefrom, sometimes more serious than that which one was endeavoring to obviate.

This invention has for its object a device having the same purposes as above mentioned, in which corrosions as well as all known inconveniences are obviated or mitigated.

Another object of the invention is to provide a means to counteract and reduce to a minimum the inertia of the movable elements during the operation of the automobile.

According to the present invention, the device comprises contacts connectible to an electrical circuit including a warning and/or control means, said contacts being bridged by means of a switch member whenever a float, by following the level of a liquid contained in a tank to be controlled, falls below a predetermined level, and said contacts and said switch member being arranged outside said tank.

The accompanying drawings illustrate, but merely by way of example, two embodiments of the invention.

Figure 2:
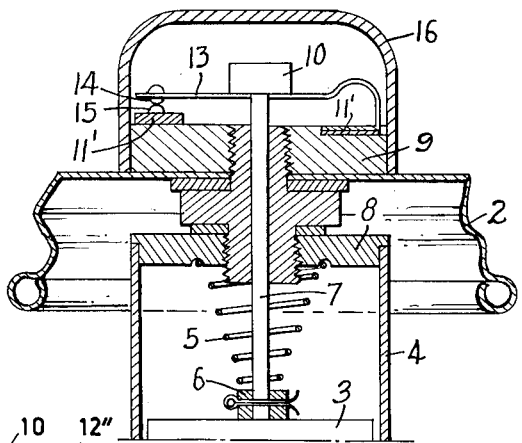
Figure 1:
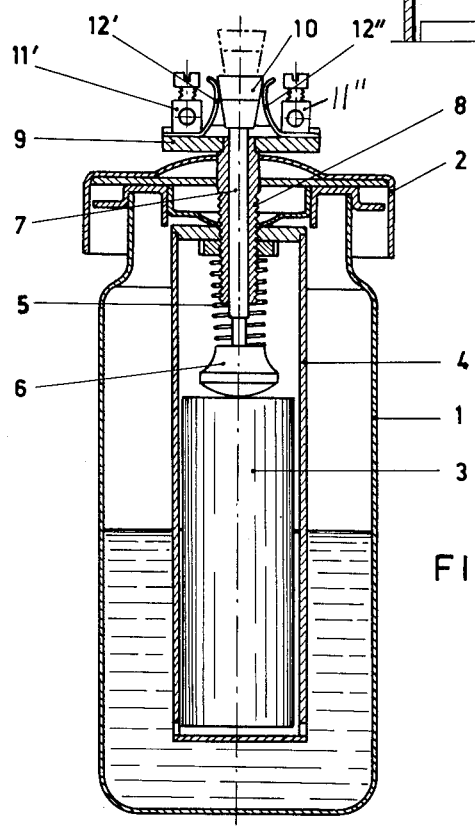

FIGS. 1 and 2 show, respectively, two axial vertical sections of tanks containing the braking liquid and fitted with the warning devices according to the invention.

Referring to the drawings, 1 shows a tank (which may be the same as that already existing in an automobile provided no alteration thereof is required) fitted with a cover 2 acting at the same time as a support for the device.

A cylinder 4 is secured to the cover 2 having a float 3 vertically movable therein.

A plug or tappet 6 resting on the float is pushed downwardly by a small spring 5 and is fastened to the end of a reciprocating rod 7. The latter passes through a sleeve 8 fitted in an insulating plate 9 secured to the cover 2, the sleeve projecting upwardly in respect of the cover. At its upper end the rod 7 is supplied with a wedge-shaped metal contact 10 electrically insulated in respect of the rod 7 or else the latter may be made of insulating material.

At both sides of said contact 10 are provided two metal resilient members 12' and 12" acting as electrical contacts and fastened to two clamps 11', 11" of an electrical circuit, the latter including a warning and/or operating device and, of course, a source of electric current, for instance, a storage battery.

While the tank containing the braking liquid is full or at least the liquid level is above the safety minimum, the float 3 will keep the contact 10 at a height above the members 12', 12" (this position being shown by dotted lines in FIG. 1). Under said circumstances the device remains inactive.

If the liquid level falls below the predetermined minimum, engagement between the contact 10 and the members 12', 12" takes place and, in consequence thereof, the warning and/or operating device is fed and operated.

The spring 5 performs an additional function which is to counteract and reduce to a minimum the inertia of the movable rod 7 and float 3 during the operation of the automobile.

The embodiment according to FIG. 2 differs from the preceding embodiment only in certain constructional features.

In FIG. 2 all parts identical or equivalent to those of FIG. 1 are indicated by the same numerals.

According to the second embodiment, a head 10 simply rests on a resilient contact member 13 which has at its end a contact 14 which, when resting on a lower contact 15, closes the circuit between the clamp 11'. The member 13, owing to its resiliency, tends to urge the contact 14 away from the contact 15 towards which it is, on the contrary, urged by the action of the spring 5 whenever the float 3 falls.

Such a device fitted on the cover 2 is preferably protected by a cap 16 preferably made of a transparent material so that the driver will be in a position to inspect the position of the head 10 and determine whether the liquid level is approaching the maximum and will attend to the matter before the warning device operates. Such a transparent cap 16 could be applied to the embodiment of FIG. 1 for like purposes.

We claim:

1. In a hydraulic brake system having in combination a tank provided with an opening in the top thereof, a removable cover for closing said opening, said cover having a central aperture extending vertically therethrough and a cylinder secured thereto with a float member movable therein, a sleeve mounted in said aperture, an insulation plate with an aperture therein mounted on the top portion of said sleeve adjacent the aperture of said cover and provided with resilient contact members, a reciprocating rod of insulating material extending through said sleeve into said cylinder, said rod having on the end extending into the cylinder a tappet which rests against said float and on the opposite end thereof a wedge-shaped member constituting a movable contact, a coiled spring surrounding said rod and confined between the top of said cylinder and tappet for normally urging said rod downwardly so as to counteract and reduce to a minimum the inertia of the movable elements, and means for electrically connecting said contact to a signal device so that normally the level of the brake fluid in said tank supports the float but when the brake fluid in said tank recedes to a predetermined low level, the tension of the spring maintains the rod in contact with the float, thereby engaging the movable contact with the contact members to energize the signal device.

2. In a hydraulic brake system according to claim 1, in which the cover has a transparent cap mounted thereon.

(References on following page)

References Cited in the file of this patent

UNITED STATES PATENTS

| | | |
|---|---|---|
| 992,711 | Freeman | May 16, 1911 |
| 1,307,086 | Dukstra | June 17, 1919 |
| 1,497,712 | Crandall et al. | June 17, 1924 |
| 1,577,686 | Breyer | Mar. 23, 1926 |
| 1,704,761 | Plant | Mar. 12, 1929 |
| 1,719,078 | Papashoili | July 2, 1929 |
| 1,745,031 | Scott | Jan. 28, 1930 |
| 2,684,414 | Kilpatrick | July 20, 1954 |
| 2,786,110 | Bitle | Mar. 19, 1957 |
| 2,894,092 | MacGriff et al. | July 7, 1959 |